Patented Sept. 15, 1953

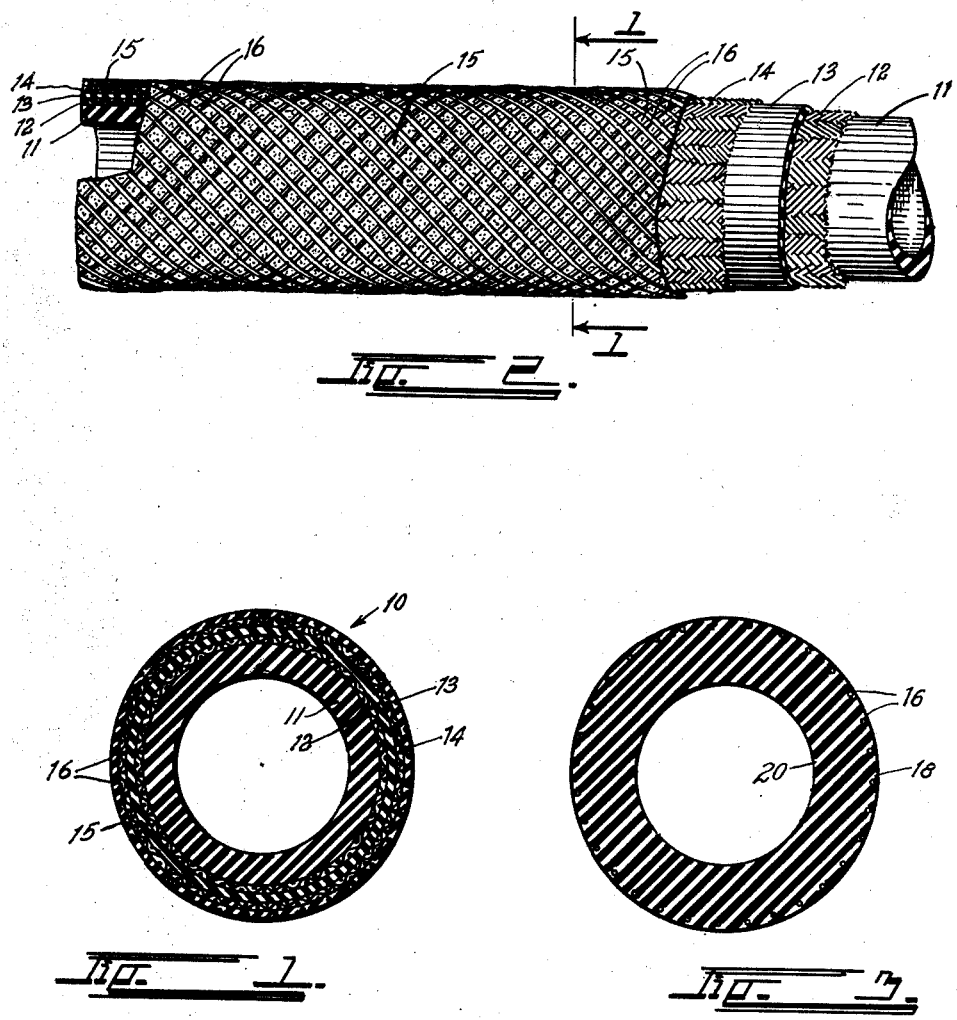

2,652,093

UNITED STATES PATENT OFFICE 2,652,093

METHOD OF MAKING REINFORCED RUBBER HOSE

Frank L. Burton, Denver, Colo., assignor to The Gates Rubber Company, Denver, Colo., a corporation of Colorado Application March 2, 1949, Serial No. 79,283

8 Claims. (Cl. 154—8)

This invention relates to improvements in methods of making rubber hose

In certain prior art hoses, especially those which convey gases, attempts have been made to provide the hose with a satisfactory cover, this cover being intended to protect the subjacent reinforcing layer or layers of the hose from abrasion and contact with deleterious materials. Certain gases such as Freon, butane, propane, steam, and gases which are liberated from certain liquids such as hot oils, are highly permeative and pass between the molecules of the hose wall. When the gas reaches the cover, it forms pockets which blister the cover, or otherwise separate it from the subjacent reinforcing layer which damages the hose and soon renders it unfit for use.

One of the common ways of obviating the blistering above referred to is to place the reinforcing layer on the outer surface of the hose so that gas, when it reaches the reinforcing, escapes therethrough. With this construction, however, the reinforcing is exposed to abrasion and contact with deleterious materials and when the reinforcing becomes worn from abrasion or weakened from contact with such materials the hose fails due to blow-outs occurring in the hose wall. It is apparent that this type of construction is not a solution to the problem and that the hose with a protective cover would be far more desirable if the blistering could be eliminated.

It has been found that blistering occurs because the cover is not anchored to the reinforcing layer and hence a line of cleavage exists between the two. When gas permeates to this line of cleavage, it builds up pressure in pockets forcing the cover away from the reinforcing layer thus producing the blister or separation of the cover from the subjacent hose wall. As will hereinafter appear, this invention provides a solution to this problem and discloses a manner in which the protective covering may be anchored to the hose wall to produce a hose which has the desirable feature of a protective cover for the reinforcing and which also eliminates the undesirable feature of blistering.

The present invention also provides a more expedient manner in which to fabricate hose of the type wherein the blistering problem is of no particular significance. For example, certain hoses are provided with a reinforcing layer of fabric adjacent their outer surface. If it be desired to cover this reinforcing layer with a protective covering of rubber, it requires additional operations during fabrication to apply the rubber after the reinforcing layer has been applied to the hose core. With the present invention these additional operations are eliminated. The resulting product, moreover, is superior to the construction just mentioned because the core below the reinforcing and the cover above it, are one integral body of rubber with the reinforcing embedded therein, there being no lines of cleavage as necessarily result in the former construction where the rubber cover is applied over a reinforcing layer.

The principal objects of this invention are to obviate the aforementioned undesirable features of hose construction and provide a method of making a hose in which blistering and separation of a protective cover are minimized or obviated.

Another object is to provide a method of making a hose in which a reinforcing layer and a wear resistant cover are integrally bonded to form a unitary cover Another object is to provide a method of making a hose in which the outermost reinforcing fibers are embedded substantially below the outer surface to form a protective layer of rubber which is an integral part of the core, this being achieved without the necessity of any additional process steps to form such layer.

Another object is to provide a method of making a hose, the cover of which is reinforced by a synthetic fiber, such as nylon.

Still further objects, advantages, and salient features of the invention will become more apparent from a consideration of the description to follow, the appended claims, and the accompanying drawing, in which:

Figure 1 is a cross section through a completed hose taken at the position of line 1—1, Figure 2;

Figure 2 is a plan view partly in section with portions of the various layers broken away, of a hose prior to curing;

Figure 3 is a section of another form of hose; and

Figure 4 is an enlarged fragmentary section of the cover, or outer portion of the hose, shown in either of the preceding Figures 1 and 3.

Referring in detail to the drawing, and particularly to Figure 1, the hose 10 comprises a hollow rubber core 11, a fabric reinforcing layer 12, a rubber layer 13, another fabric reinforcing layer 14 and a rubber cover 15 having nylon threads 16 formed of a plurality of filaments embedded therein, there being integral rubber layers 17 and 18 on each side of the nylon threads, as shown in Figure 4. The construction below the cover is conventional and the reinforcing may be braided cords or fibers, as shown, a woven fabric, or any other reinforcing well known in the art and any number of reinforcing layers may be employed, as desired.

The hose is built up and the rubber cover 15 applied as understood in the art. The nylon threads 16, as shown in Figure 2, are then braided onto the outside surface of the uncured cover, the threads being tensioned as they are braided or otherwise wound onto the outer surface of the cover.

The hose is then cured and due to the characteristic of nylon to shrink when heat is applied thereto, the threads cut into the surface of the cover, the rubber flowing between the threads thus embedding themselves and leaving a protective layer 18 of rubber outside of the threads. Nylon, after being shrunk by heat, also has the characteristic of retaining its shrunk length after being cooled, whereas where cotton or other fibers are employed, which do not have the characteristic of shrinking when heated, the fibers do not cut into the surface of the cover, but on the contrary, remain on the surface with no protective rubber layer thereover. With the present construction, the cover is drawn tightly about and bonded securely to the subjacent layer 14 and when gas reaches the cover, rather than form blisters, it passes through the cover wall, leaving the cover anchored to the subjacent layer.

The nylon threads have been illustrated as being braided, but it is to be understood that the braiding is not essential to the invention in its broadest aspects. A single spiral thread of nylon may be employed, if desired, or oppositely spiralled threads which cross each other, but not interwoven as in a braid. The distance between adjacent threads may be chosen as desired and, of course, the number and size of the filaments to each thread may be varied.

Figure 3 illustrates the same principles above described as applied to a hose having a rubber core 20, whose outer layer of rubber is integral with the inner layers and which is without reinforcement except that provided by the nylon threads. In this construction the uncured rubber core is formed in any manner well known in the art. The nylon threads are then applied to its outside surface and during the curing process they cut themselves into the surface to a position therebelow, leaving a protective layer of rubber 18, as in Figure 4, forming a wear surface of appreciable thickness which protects the threads from abrasion. The principal purpose of the threads in this construction is to reinforce the hose wall. If the same procedure had been followed using threads which do not shrink when heated, the threads would not have cut into the surface and formed the protective layer 18. As previously suggested, a cover similar to cover 18 could be provided over threads of the type just referred to, but it would require an additional step or steps in the manufacturing process which are eliminated by this invention and would not prevent the undesirable feature of blistering.

In the construction herein disclosed, the nylon threads 16 may be formed of a plurality of filaments which lie side by side in twisted condition to form a thread or cord. It is to be understood that the invention is not so limited, however, and that a single filament may be used instead of a plurality to each thread. Materials other than nylon are also contemplated within the purview of the invention. Examples of such materials which behave similar to nylon during the curing are "Fiber V" and "Orlon," products of E. I. du Pont de Nemours and Co. "Nylon" is a synthetic linear polymer produced by the reaction of hexamethylene diamine with adipic acid, the molecule being entirely aliphatic and based on the formation of polyamides; "Fiber V" is produced by reaction of terephthalic acid and ethylene glycol; and "Orlon" formerly known as "Fiber A" is produced by polymerization of monomeric acrylonitrile under the influence of catalysts. The principles disclosed herein are applicable to hoses made of rubber of either natural or synthetic types and the term "rubber" as employed in the claims is to be construed to cover both types.

Having described the invention what is claimed as new is:

1. A method of making a hose, which comprises forming a core having an outer layer of uncured rubber; winding, under tension and around the outside of said outer uncured rubber layer elements, formed of heat shrinkable synthetic fibers; and then curing by heat the rubber thereof, to form a hose wherein said elements are embedded within the outer layer of rubber after curing and the outer surface of said hose is rubber.

2. A method of making a hose, as defined in claim 1, wherein said elements are wound spirally around said outer uncured rubber layer.

3. A method of making a hose, as defined in claim 1, wherein said elements are braided.

4. A method of making a hose, as defined in claim 1, wherein said elements are wound spirally in two directions around the outside of said outer uncured rubber layer.

5. A method of making a hose, as defined in claim 1, wherein said core comprises a plurality of alternating layers of rubber and fabric.

6. A method of making a hose, as defined in claim 1, wherein said heat shrinkable synthetic fibers comprise a reaction product of hexamethylene diamine with adipic acid.

7. A method of making a hose, as defined in claim 1, wherein said heat shrinkable fibers comprise a reaction product of terephthalic acid and ethylene glycol.

8. A method of making a hose, as defined in claim 1, wherein said heat shrinkable synthetic fibers comprise a product of catalytic polymerization of a monomeric acrylonitrile.

FRANK L. BURTON.

References Cited in the file of this patent

UNITED STATES PATENTS

| Number | Name | Date |
| --- | --- | --- |
| 1,352,740 | Egerton | Sept. 14, 1920 |
| 2,262,861 | Rugeley et al. | Nov. 18, 1941 |
| 2,273,200 | Hoff | Feb. 17, 1942 |
| 2,307,846 | Miles | Jan. 12, 1943 |
| 2,377,316 | Billmeyer | June 5, 1945 |
| 2,470,599 | Billmeyer | May 17, 1949 |
| 2,512,433 | Leben | June 20, 1950 |
| 2,564,602 | Hurst | Aug. 14, 1951 |

FOREIGN PATENTS

| Number | Country | Date |
| --- | --- | --- |
| 506,893 | Great Britain | June 6, 1939 |
| 576,551 | Great Britain | Apr. 9, 1946 |